United States Patent Office 3,595,887
Patented July 27, 1971

3,595,887
HYDROGENATION OF POLYMERIC FAT ACIDS
Madhukar V. Kulkarni and Russell L. Scheribel,
Kankakee, Ill., assignors to General Mills, Inc.
No Drawing. Filed Aug. 12, 1968, Ser. No. 751,701
Int. Cl. C11c 3/12
U.S. Cl. 260—409                               16 Claims

ABSTRACT OF THE DISCLOSURE

There is disclosed an improved method of hydrogenating polymeric fat acids employing a two step process comprising first hydrogenating with a nickel catalyst followed by a second hydrogenation with a palladium catalyst. An optional acid treatment step between the two hydrogenation steps is also disclosed which involves treatment with an acid and an acid activated clay. The final products are useful in preparing polymers such as polyesters, diisocyanates, ester based urethanes, polyamides, and epoxy resins, which find utility in adhesives, coatings, castings, laminates, can sealants and inks.

---

This invention relates to an improved process of hydrogenation of polymeric fat acids and in particular to a two step process comprising a prehydrogenation with a nickel catalyst followed by a post hydrogenation with a pallidum catalyst.

Polymeric fat acids are well known commercially available products. Such acids have been hydrogenated in the past. Common methods employed have used nickel catalysts such as Raney nickel and nickel with inert material such as kieselguhr or clays, which are often used as carriers. While such nickel catalysts have provided improved color, such catalysts did not significantly reduce the iodine value of the polymeric fat acids, particularly under the usual conditions of hydrogenation. Attempts to further reduce the iodine value using such catalysts by employing drastic or severe reaction conditions of pressure and temperature, while providing some additional reduction in iodine value results in degradation of the product.

Palladium and platinum catalysts have also been employed in the past. While such catalysts are effective to provide improved color and relatively low iodine values, such catalysts are expensive to employ, particularly in the amounts necessary to be used to achieve the optimum results. Further, such catalysts become contaminated or "poisoned" in the process, which provides further economic disadvantages.

These polymeric fat acids are useful in preparing polymers such as polyesters, ester based urethanes, polyamides and epoxy resins. These derivatives find application in adhesive, coatings, castings, laminates, can sealants, inks and the like.

A new and improved process for hydrogenating polymeric fat acids which avoids the disadvantages of the past methods, has now been discovered. Briefly, the process involves a two step process using a different catalyst in each step. In the first step or prehydrogenation step, a nickel catalyst is employed. The polymeric fat acids are treated with hydrogen in the presence of a nickel catalyst to improve the color and to reduce the iodine value to some extent. Accordingly, the first step is a hydrogenation employing a nickel catalyst. The second or post hydrogenation step, is treatment with hydrogen in the presence of a palladium catalyst.

In the first step using a nickel catalyst, significant improvement in color results. However, the nickel catalyst does not provide significant reduction in iodine value. Further improvement in color and significant reduction in iodine value is obtained in the second step using the palladium catalyst. It was found that by using the nickel step before the palladium hydrogenation, the amount of palladium necessary to achieve the color and low iodine value is significantly less than that required to achieve the same results using a palladium catalyst without the prehydrogenation with nickel. It was also found that where pretreatment with a nickel catalyst is carried out, contamination or poisoning of the palladium catalyst is minimized, if not completely eliminated. This result permits reuse of the palladium catalyst thereby providing further significant economic advantages. In addition, lower levels of catalyst provide for ease of filtration. It was further found that the process of the present invention provides for achievement of the desired or improved result of low color and iodine value, with operation at milder reaction conditions so that any degradation of product resulting from severe hydrogenation conditions are minimized.

As indicated above, the process of the present invention relates in particular to hydrogenation of polymeric fat acids. Polymeric fat acids are well known and commercially available. The term "polymeric fat acid," as used herein, refers to a polymerized fat acid, either dimeric, trimeric or higher polymeric forms. Generally available products usually contain a predominant portion of dimer acids, a small quantity of trimer and higher polymeric forms, and some residual monomer. As used herein, "trimer" will also include the higher polymeric forms. The term "fat acid," as used herein, refers to the naturally occurring and synthetic monobasic aliphatic acids having hydrocarbon chains of 8–24 carbon atoms. The term "fat acids" therefore includes saturated, ethylenically unsaturated, and acetylenically unsaturated acids.

Sources of naturally occurring fat acids are those found in fats and oils, such as the drying or semidrying oils. The polymeric fat acids thus result from the polymerization of drying or semidrying oils or the free acids thereof or the simple aliphatic alcohol esters of such acids such as the methyl esters or other alkyl esters in which the alkyl group has from 1 to 8 carbon atoms. Suitable drying or semidrying oils include soybean, linseed, tung, perilla, oiticica, cottonseed, corn, sunflower, safflower, dehydrated castor oil, and the like. Suitable fatty acids may also be obtained from tall oil, soap stock, and other similar materials. In the polymerization process, the fat acids combine to provide a mixture of dimeric and higher polymeric forms generally referred to as dimer, trimer, and so forth. One method of polymerization of the unsaturated fatty acids using a clay catalyst can be seen in U.S. Pat. 3,157,681.

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxide catalyst such as di-t-butyl peroxide. Because of the low yields of polymeric products, these materials are not commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride, and other Lewis acids, anthraquinone, sulfur dioxide, and the like. Suitable monomers include the branched straight chain, poly- and mono-ethylenically unsaturated acids such as 3-octanoic acid, 11-dodecanoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, eicosatetraenoic acid, nisinic acid, scoliodonic acid, and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both monounsaturated and polyunsaturated, are useful monomers for the preparation of the polymeric fat acids. Suitable examples of such materials include 10-undecenoic acid, tariric acid, stearolic acid, behenolic acid and isamic acid.

Because of their ready availability and relative ease of polymerization, oleic and linoleic acids are the preferred starting materials for the preparation of the polymeric fat acids. Mixtures of oleic and linoleic acids are commercially available in tall oil fatty acids which accordingly is the common source for commercially available polymeric fat acids today. Thus most commercial products are prepared from $C_{18}$ unsaturated fatty acids which result in a $C_{36}$ carbon dimeric fat acid. These are accordingly the most preferred starting materials for the present invention. Other products prepared from $C_{14}$-$C_{20}$ acids are accordiigly of lesser significance.

In discussing the improved colors achieved in the present invention, colors less than Gardner 1 are achieved, which is the lowest or lightest color on the Gardner standard. Since it is possible by means of the present invention to obtain colors below a Gardner color of 1, a different means of measuring color must be used to show relative color values below this point. Photometric methods of measuring color are one means which may be employed. One such method involves the use of a Coleman, Jr., Model 6A Spectrophotometer calibrated to give the following readings of a standard nickel sulfate solution.

| Millimicrons: | Transmittance, percent |
|---|---|
| 400 | Less than 4.0 |
| 460 | 26.2±2.0 |
| 510 | 73.9±1.0 |
| 550 | 54.8±1.0 |
| 620 | 5.2±0.5 |
| 670 | 1.1±0.5 |
| 700 | Less than 2.0 |

The instrument is calibrated, using a standard nickel sulfate solution which may be purchased in a 25 ml. cuvette. This standard solution may be prepared by dissolving 200 grams of $NiSO_4$, $6H_2O$, AR, and diluting to exactly 1000 ml. of a volumetric flask at a temperature between 25–30° C. The nickel content of the solution should be between 4.40 and 4.46 grams of nickel per 100 ml. After calibration, the transmittance is read on a 25 ml. sample in a cuvette at 10–20° C. at 5 wavelengths from 400–500 millimicrons using a 25 ml. cuvette of distilled water for adjusting transmission to 100% at each wavelength. The average of these 5 values is the photometric color as follows:

$$\text{Photometric color} = \frac{T_{400} + T_{425} + T_{450} + T_{475} + T_{500}}{5}$$

where T is percent transmission.

Unless otherwise indicated, the photometric color stated herein was determined by the above described method. For purposes of comparison and as a guide, the following is a comparison of Garner color and the above described photometric color on various samples.

| Gardner color: | Photometric color, percent |
|---|---|
| 7–8 | 18.6 |
| 6–7 | 24.2 |
| 5–6 | 32.8 |
| 4– | 47.4 |
| 1–2 | 63.4 |
| 1–2 | 65.8 |
| 1+ | 68.5 |
| 1+ | 69.8 |
| 1+ | 71.3 |
| 1 | 78.3 |
| <1 | 80.5 |

With regard to the foregoing correlation, it should be remembered that Gardner color is a visual comparison of the sample color with the standard and is not therefore a precise measurement. This is especially true in the range of Gardner 1. Thus, a Gardner color of 1 will correspond approximately to a photometric color of about 74–79%.

In discussing the polymeric fat acids, reference is made to the monomer (M), dimer (D) and trimer (T) present therein. The amounts thereof expressed in percent by weight were determined by gas-liquid chromatography of the corresponding methyl ester. In such method a fraction intermediate the monomer and dimer is found, which is accordingly expressed as intermediate (I) herein.

The iodine value is the centigrams of iodine absorbed per gram of sample and is determined by a rapid Wijs method using chloroform as the sample solvent in place of carbon tetrachloride and a sample size of 0.250 gram or less.

In each of the hydrogenation steps, reaction conditions of time, temperature and pressure vary widely although it is preferred to operate at the milder reaction conditions. Hydrogenation is commonly conducted at pressures above 100 p.s.i.g. and pressures as high as 3000 p.s.i.g. or higher have been employed. However, in this invention since the significant reduction in iodine value takes place in the palladium hydrogenation step, the initial treatment with the nickel catalyst can be conducted at only minimal pressures, i.e. above 5 p.s.i.g., and more preferably above 10 p.s.i.g. In the palladium hydrogenation step, however, pressures above 100 p.s.i.g. to about 1200 p.s.i.g. are preferred, while pressures of 100–500 p.s.i.g. are preferred in the nickel hydrogenation in batch process operation. Hydrogenation is commonly conducted over a wide temperature range of about 125–300 or about 350° C. In the present invention, in a batch process, the preferred temperature range is about 150–225° C. for the nickel hydrogenation and about 175–275° C. for the palladium hydrogenation, with about 180 or 225° C. being most preferred. In a batch process from 1–10 hours may be employed, generally 3–5 hours being used. The exact temperature and pressure, and particularly time, are not critical; however, the combination of conditions must be sufficient to effect hydrogenation. In a continuous process, process times as low as 5 to 30 minutes may be employed for example. Also, in a continuous process, higher temperatures and pressures may desirably be employed in view of the shorter residence time for the reaction which results in severe degradation of product being further minimized in spite of relatively severe conditions of pressure and temperature.

A typical procedure for the hydrogenation in each step can be seen from the following, which is the procedure employed in the examples which follow herein to illustrate the invention.

The polymeric fat acids and catalyst are loaded into a 50 gallon stainless steel agitated reactor. The reactor is then sealed, evacuated and pressurized with hydrogen. The contents of the reactor were then heated under hydrogen pressure. The reactor was then vented and simultaneously cooled to 150° C. or less. Nitrogen pressure was then applied and the catalyst removed by filtration.

In the first step using a nickel catalyst, any unsaturation-reducing nickel catalyst can be employed including commercially available catalysts such as Raney nickel or nickel combined or carried with inert materials such as kieselguhr, alumina or clays. Any inert carrier may be employed for the nickel catalyst. Illustrative commercially available nickel catalysts are Raney nickel, Harshaw 0104P and 1404P, and Girdler G69, G49A, G49B, the last mentioned catalyst being preferred in this invention. This catalyst, G49B, is a nickel on kieselguhr containing about 50–55% nickel. The amount of catalyst employed will vary dependent on the specific catalyst and reaction conditions employed. In general at least 0.1% of catalyst based on the amount of polymeric fat acid will be used. It is generally not necessary to exceed 5%. With the preferred catalysts amounts of 0.1–1.0% are employed, more commonly about 0.25–0.75%. In general at the higher pressures and temperatures, i.e., 1000 p.s.i.g. and 200° C., about 0.25% is suitable while at conditions of 400 p.s.i.g. and 180° C. about 0.5% is more desirable.

In the second hydrogenation, there is employed a palladium catalyst which is usually suspended on an inert carrier such as carbon and the like. Any suitable inert carrier may be employed; however, the use of carbon as a carrier is preferred. In illustrating the present invention, the catalyst consisted of 5% palladium by weight on carbon. Other catalysts using carbon as a carrier are available with 1 or 2% palladium thereon. As with the nickel hydrogenation, the amount of catalyst employed will be dependent on the specific catalyst and reaction conditions employed. As a general range from 0.05% by weight based on polymeric fat acid feed may be employed. While large amounts even exceeding 5% could be employed, these provide no significant advantage and are uneconomical. Accordingly, a preferred range of catalyst level is from 0.05 to about 1.0%, and most preferably 0.1 to 0.5%. In a batch process with the preferred catalyst, 5% palladium on carbon, at higher temperatures and pressures, i.e., 1000 p.s.i.g. and 250° C., about 0.1% (dry basis) is preferred while at 400 p.s.i.g. and 180° C., about 0.25% is preferred.

An optional additional step may be employed. If employed, the step is carried out after the nickel hydrogenation and prior to the palladium hydrogenation. The treatment involves acid treatment of the nickel hydrogenated product. It was found that this treatment provides further improvement in color and color stability as well as eliminating or removing any nickel salts resulting from the nickel hydrogenation. While this treatment is desirable in order to obtain optimum results, it can be omitted. If nickel salts are found and cannot be tolerated in the next step or in the final product from the standpoint of color, color stability or final iodine value, this treatment is most desirable. Other methods of removing or preventing nickel salt formation may also be employed, if desired.

In this optional treatment, the nickel hydrogenated product is treated with a clay such as Super Filtrol Grade I, preferably in the presence of an acid such as phosphoric acid, which is preferred. Other acids may also be employed however. Super Filtrol Grade I is an acid activated montmorillonite species of clay. Other clays may also be employed. However, the montmorillonite clays are preferred, the most preferred being the acid activated or naturally occurring acid clays.

In this treatment the clay is employed in an amount of about 1–10% by weight based on the polymeric fat acid with about 1–3% being preferred. The preferred acid is phosphoric acid preferably about 60–85% concentration which is employed in an amount of about 0.25–3% by weight based on the polymeric fat acids. About 0.5 to 1.0% of phosphoric acid (70–75% concentration) is preferred.

It is preferred to further cool the product from the nickel hydrogenation down to about 100° C. or less before adding the clay and acid. Preferably, the treatment is conducted under a nitrogen, carbon dioxide, or hydrogen atmosphere or any inert atmosphere to exclude any air. The mixture is then preferably heated to about 120–130° C. under a pressure above 5 p.s.i.g. for about 15 min. to 1 hr., preferably about 30 minutes. The pressures are obtained from either nitrogen or hydrogen gas, the hydrogen being preferred. Pressures up to about 200 p.s.i.g. may be employed, however, pressures above 100 p.s.i.g. are not usually exceeded. After treatment the treatment vessel is vented and vacuum applied to remove any water. The mixture is then filtered at about 100–150° C., preferably about 125° C.

For the purpose of illustrating the invention commonly available polymeric fat acids such as those provided under the trade name "Versadyme" were employed. Such polymeric fat acids are clay polymerized tall oil fatty acids. Typical of the tall oil fatty acids which are polymerized today are those commercially available and sold under the name Pamak I. These acids have the following typical analysis:

| | |
|---|---|
| Acid value (A.V.) | 192.0 |
| Saponification value (S.V.) | 196.7 |
| Unsaponifiable, percent | 1.5 |
| Iodine No. (I.V.) | 133.4 |
| Gardner color | 4–5 |

The resulting available polymeric fat acids have the following typical values:

| | |
|---|---|
| A.V. | About 193 |
| S.V. | About 198 |
| I.V. | About 115 |

The various grades available will vary in color and dimeric fat acid content. A typical dimeric fat acid content of one grade is about 70% and a Gardner color of about 5–8. Other grades contain dimeric contents above 90% and Gardner colors of about 3–6.

The invention may be illustrated by means of the following examples in which the typical hydrogenation procedure earlier described is followed. The remaining details as to the reactants and reaction conditions can be seen from the following examples.

EXAMPLE I

In this example the feed product was "Versadyme" 204 (a clay polymerized tall oil fatty acid), having the following analysis:

| | |
|---|---|
| A.V. | 192.3 |
| S.V. | 197.3 |
| I.V. | 114.8 |
| Gardner color | 5+ |
| Fe, p.p.m. | 1 |
| P, p.p.m. | 16 |
| Ash, percent | 0.1 |
| M, percent | 8.1 |
| I, percent | 5.5 |
| D, percent | 71.0 |
| T, percent | 15.5 |

Following the typical procedure set forth earlier, these polymeric fat acids (350 pounds) were hydrogenated using hydrogen in the presence of 1.75 pounds (water drained weight) of a Raney nickel catalyst. The hydrogenation was conducted for 2 hours at about 180° C. and a pressure of 400 p.s.i.g. The resulting product (A) after filtration at about 70° C. had a photometric color of 52.6%.

The foregoing was repeated using the same reactants, amounts and conditions. The resulting product (B) had a photometric color of 56.3%.

EXAMPLE II

In this example there is seen the subsequent palladium hydrogenation. The same typical hydrogenation procedure was followed. The feed material was 115 pounds of product A of Example I and 45 pounds of Product B of Example I. The palladium catalyst was 5% palladium on carbon containing about 50% moisture, which was employed in an amount of 0.8 pounds. The hydrogenation was carried out at 800 p.s.i.g. and 200° C. for 4 hours. The resulting product had the following properties:

A.V. _____ 191
S.V. _____ 199.7, 200.7
I.V. _____ 20.0
Photometric color, percent _____ 78.5

EXAMPLE III

In this example, 200 pounds of product A of Example I was employed as a feed material. The catalyst was 1 pound of the 5% palladium on carbon containing 50% moisture (¼% catalyst on a dry basis). The hydrogenation was conducted for 4 hours at 200° C. and 400 p.s.i.g. Samples were taken at periodic intervals, the iodine values of the various samples and the properties of the final product can be seen as follows:

Sample: I.V.
    1 hour _____ 51
    2 hours _____ 33.7
    3 hours _____ 28.2
    Final product _____ 21.6
        Photometric color, percent _____ 80.1
        A.V. _____ 189.6
        S.V. _____ 195.4, 194.4
        Ash _____ 0.02, 0.04
        Ni, p.p.m. _____ 7

EXAMPLE IV

In this example, the feed material was a clay polymerized tall oil fatty acid having the following analysis:

A.V. _____ 191.7, 191.5
S.V. _____ 196.0, 196.3
I.V. _____ 95.1, 94.1
Gardner color _____ 8+
M, percent _____ 6.1
I, percent _____ 8.8
D, percent _____ 69.9
T, percent _____ 15.1

The foregoing was hydrogenated employing the typical procedure using 300 pounds of feed material and 3 pound of a nickel catalyst consisting of 50–55% nickel on kieselguhr (G49B). The reaction was conducted for 4 hours at about 180° C. and 400 p.s.i.g. The resulting product after filtration at 150° C. had a Gardner color of 4.

The resulting product was then given an acid treatment as earlier described using 7 pounds of an acid activated montmorillonite clay (Super Filtrol Grade I) and 1.4 pounds of phosphoric acid (70% concentration). The treatment was conducted for 30 minutes at about 125° C. The resulting product after filtration had a Gardner color of 3— and an iodine value of 84.

EXAMPLE V

The product of Example IV, (111 pounds) after the acid treatment, was then hydrogenated with 0.2775 pound of the same palladium catalyst as Example III (0.25% wet basis) following the typical procedure and conditions of about 200° C. and 400 p.s.i.g. for 4 hours. The resulting product had a photometric color of 75% and an iodine value of 26.4.

EXAMPLE VI

In this example there were employed 300 pounds of a clay polymerized tall oil fatty acid having the following analysis:

A.V. _____ 194.5, 194.4
S.V. _____ 198.5, 198.9
I.V. _____ 120.1

Gardner color _____ 5—
Fe, p.p.m. _____ 7
P, p.p.m. _____ 9
Ash, percent _____ 0.00
M, percent _____ 1.1
I, percent _____ 3.8
D, percent _____ 93.3
T, percent _____ 1.8

The hydrogenation, following the typical procedure, employed 1.5 pounds of the nickel on kieselguhr catalyst of Example IV and conditions of about 180° C. and 400 p.s.i.g. for 4 hours. The product was then acid treated as described in Example IV, employing 5% of the same acid activated montmorillonite clay and 1% of phosphoric acid (70–75% concentration). After stripping of excess water and filtration at 100° C. the product had the following analysis:

A.V. _____ 194.6
S.V. _____ 200.4
I.V. _____ 100.4
M, percent _____ 1.2
I, percent _____ 3.7
D, percent _____ 93.8
T, percent _____ 1.3

EXAMPLE VII

The product of Example VI, (140 pounds) was then hydrogenated using the typical procedure and 0.7 pound of the catalyst of Example II. The hydrogenation conditions were about 200° C. at 400 p.s.i.g. for 4 hours. The resulting product had a photometric color of 92%. The product upon refiltering had a photometric color of 94.5% and the iodine value was 15.6.

EXAMPLE VIII

In this example the starting material was a clay polymerized tall oil fatty acid having the analysis:

A.V. _____ 194.3, 193.9
S.V. _____ 196.2, 196.0
I.V. _____ 109.1, 108.9
Gardner color _____ 4—
M, percent _____ 0.6, 0.4
I, percent _____ 4.3, 4.4
D, percent _____ 92.5, 92.5
T, percent _____ 2.6, 2.7

Following the typical procedure 196 pounds of these polymeric fat acids were hydrogenated using 1 pound of the nickel on kieselguhr catalyst (G49B) at about 180° C. and 400 p.s.i.g. for 4 hours. The resulting product had an iodine value of 90.6, 90.2 and a photometric color of 84.6 before acid treatment. The acid treatment consisted of treatment with 10 pounds of an acid activated montmorillonite clay (Super Filtrol Grade I), 2 pounds of phosphoric acid (85% concentration) and 2 pounds of water for 1 hour at 70–75° C.

The foregoing was repeated using conditions of 4 hours at about 170° C. and 950 p.s.i.g. The product had an iodine value of 81.1. The photometric color before acid treatment was 84.9% and after acid treatment was 88.7%.

EXAMPLE IX

One hundred pounds of each of the two products of Example VIII were blended and the resulting blend was then hydrogenated using 0.4 pound of the 5% palladium on carbon catalyst (50% moisture) at about 200° C. and 950 p.s.i.g. for 4 hours. The resulting product had a photometric color of about 95% and an iodine value of 18.3, 18.9.

EXAMPLE X

The clay polymerized fatty acids employed had the following analysis:

| | |
|---|---|
| A.V. | 194.3, 193.9 |
| S.V. | 197.3 |
| I.V. | 114.8 |
| Gardner color | 5+ |
| Fe, p.p.m. | 1 |
| P, p.p.m. | 16 |
| Ash, percent | 0.01 |
| M, percent | 8.1 |
| I, percent | 5.5 |
| D, percent | 71.0 |
| T, percent | 15.5 |

Three hundred pounds of the foregoing acids were then hydrogenated following the typical procedure, using 1.5 pounds of a nickel on kieselguhr catalyst (G49B) at about 180° C. and 400 p.s.i.g. for 4 hours. After acid treatment with 2.2% of Super Filtrol Grade I and 0.5% of phosphoric acid (75% concentration) at 115° C. for 30 minutes the product had a photometric color of 65.0%. The product had an iodine value of 92.1, 91.1.

The foregoing was then repeated to provide a product having a photometric color of 66.7% and an iodine value of 88.9, 89.7.

The two batches of nickel hydrogenated products were then combined and 160 pounds thereof rehydrogenated following the typical procedure, using 0.8 pounds of the 5% palladium on carbon catalyst containing 50% moisture (0.25% on a dry basis), at about 200° C. and 950 p.s.i.g. for 4 hours. The product after cooling and venting had an iodine value of 9.5 and a photometric color 93.5%. After filtration and recovery, the product had a a photometric color of 86.6% and after refiltering a color of 90%.

A polyamide resin was then prepared by acidification at 205° C. for about 5 hours of the palladium rehydrogenated product employing 120 pounds of the hydrogenated polymeric fat acids, 9.67 pounds of hydrogenated monomeric tall oil fatty acids and 13.38 pounds of ethylene diamine. The final polyamide resin had the following analysis and properties:

| | |
|---|---|
| Acid No. | 7.4 |
| Amine No. | 2.0 |
| Ball and ring melting point ° C. | 112 |
| Gardner color | <1 |
| Viscosity (poise at 160° C.) | 28.5 |

The foregoing examples represent some specific embodiments of the present invention. From these examples and numerous other specific runs substantially cumulative thereto, the preferred embodiment of reaction conditions and typical results achieved employing feed materials of the type shown in Examples I and VI may be summarized as follows wherein the typical hydrogenation procedure earlier described was employed:

(I) NICKEL PREHYDROGENATION

(A) Hydrogenation conditions

Catalyst—Girdler G49B (nickel on kieselguhr)
Catalyst level—½%
Pressure—400 p.s.i.
Temperature—180° C.
Time—4 hours

(B) Acid treatment of nickel hydrogenated dimer

Cool the nickel hydrogenated dimer and catalyst to less than 100° C. Vent the reactor and blanket with nitrogen. Add 2% Super Filtro Grade I and ½% of 75% phosphoric acid. Pressurize with hydrogen and heat to 125° C., holding at 125° C. and 100 p.s.i. hydrogen pressure for ½ hour. Vent hydrogen. Pull vacuum to remove water. Pressurize with nitrogen and filter.

C. Typical Analyses of Products

| Type of feed | Example VI | Example I |
|---|---|---|
| Iodide value | 85–110 | 85–1 00 |
| GMI color (percent transmission) | 75–90 | 50–71 |
| Percent M, I, D and T | Substantially unchanged from starting material. | |

A. Hydrogenation Conditions

Feed: Nickel prehydrogenated dimer

| | | |
|---|---|---|
| Catalyst | 5% palladium on carbon | |
| Pressure, p.s.i. | 1,000 | 400 |
| Catalyst level (dry basis) percent | 0.1 | 0.25 |
| Temperature, ° C. | 200 | 180 |
| Time, hrs. | 4 | 4 |

B. Typical results

| | 1,000 p.s.i. | | 400 p.s.i. | |
|---|---|---|---|---|
| Type of feed | Ex. VI | Ex. I | Ex. VI | Ex. I |
| Iodide value | 10–15 | 15–20 | 10–20 | 20–30 |
| GMI color (percent trans.) | 97+ | 85–90 | 95+ | 80–85 |
| A.V. | 194 | 192 | 194 | 192 |
| S.V. | 197 | 196 | 197 | 169 |
| Percent M, I, D and T | Substantially unchanged from starting material. | | | |

It is to be understood that the invention is not to be limited to the exact details of operation or exact compounds shown and described, as obvious equivalents and modifications will be apparent to one skilled in the art and the invention is to be limited only by the scope of the appended claims.

The embodiments of the invention in which an exclusive property or privilege is claimed are defined as follows:

1. In a process of hydrogenating polymeric fat acids, wherein the improvement comprises first hydrogenating polymeric fat acids in the presence of a nickel hydrogenation catalyst and subsequently rehydrogenating the product resulting from said first hydrogenation in the presence of a palladium hydroenation catalyst.

2. A process as defined in claim 1 wherein said nickel catalyst is selected from the group consisting of Raney nickel and nickel on an inert carrier and said palladium catalyst is palladium on an inert carrier.

3. A process as defined in claim 2 wherein said inert carrier for said nickel catalyst is selected from the group consisting of kieselguhr and clay and said insert carrier for said palladium catalyst is carbon.

4. A process as defined in claim 1 wherein said palladium catalyst comprises 1–5% by weight palladium on carbon and said nickel catalyst, 50–55% by weight, of nickel on kieselguhr.

5. A process as defined in claim 1 wherein said polymeric fat acid is polymerized tall oil fatty acids.

6. A process of hydrogenating polymeric fat acids comprising first hydrogenating said polymeric fat acids in the presence of about 0.1 to 5% by weight of said polymeric fat acids of a nickel hydrogenation catalyst at temperatures of about 125–350° C. and hydrogen pressures above 5 p.s.i.g. and subsequently rehydrogenating the product resulting from said first hydrogenation in the presence of about 0.1 to 5% by weight of a palladium hydrogenation catalyst at temperatures in the range of 125–350° C. and hydrogen pressure above 100 p.s.i.g.

7. A process as defined in claim 6 wherein said nickel hydrogenation catalyst is nickel on kieselguhr and said palladium catalyst is palladium on carbon.

8. A process as defined in claim 7 wherein said nickel comprises about 50% by weight of said nickel catalyst and said palladium comprises about 5% by weight of said palladium catalyst.

9. A process as defined in claim 8 wherein said nickel catalyst is employed in an amount of 0.11–1% by weight of polymeric fat acids and said first hydrogenation is conduced at a temperature in the range of 150 to 225° C. and a pressure of 100–500 p.s.i.g. and wherein said palladium catalyst is employed in an amount of 0.1 to 1.0% by weight based on said nickel hydrogenated polymeric fat acid product and said rehydrogenation is conducted at a temperature of 175 to 275° C. and a pressure of 100 to 1200 p.s.i.g.

10. A process as defined in claim 6 wherein said polymeric fat acid is polymerized tall oil fat acids.

11. A process as defined in claim 6 wherein the product resulting from said first hydrogenation is treated with an acid activated montmorillonite clay and phosphoric acid prior to said rehydrogenation with said palladium catalyst.

12. A process as defined in claim 11 wherein said acid clay and phosphoric acid treatment is conducted at a temperature of below 150° C.

13. A process as defined in claim 12 wherein said clay is employed in an amount of 1.0 to 3.0% by weight based on the product being treated and said phosphoric acid is employed in an amount of 0.25 to 3.0% by weight based on the product being treated.

14. A process of hydrogenating polymeric fat acids comprising first hydrogenating said polymeric fat acids in the presence of 0.5% by weight based on said polymeric fat acids of a nickel on kieselguhr catalyst containing about 50% nickel by weight, at a temperature of about 180° C. and a hydrogen pressure of about 400 p.s.i.g. for about 4 hours and subsequently rehydrogenating the product resulting from said first hydrogenation in the presence of 0.1–0.25% by weight based on said nickel hydrogenated product of a 5% palladium on carbon catalyst at a temperature of 180–200° C. and a hydrogen pressure of 400–1000 p.s.i.g. for about 4 hours.

15. A process as defined in claim 14 wherein said polymeric fat acids are polymerized tall oil fatty acids.

16. A process as defined in claim 14 wherein the product resulting from said first hydrogenation is treated at 125° C. for 30 minutes prior to said rehydrogenation with 2% by weight based on the product resulting from said first hydrogenation of an acid activated montmorillonite clay and 0.5% of phosphoric acid based on the product resulting from said first hydrogenation, said phosphoric acid having a concentration of 75% by weight.

References Cited

UNITED STATES PATENTS

| | | | |
|---|---|---|---|
| 3,484,421 | 12/1969 | Pine et al. | 260—690X |
| 3,271,410 | 9/1966 | Cagneron et al. | 260—409 |
| 3,256,304 | 6/1966 | Fischer et al. | 260—407 |
| 2,602,807 | 7/1952 | Morris et al. | 260—409 |

LEWIS GOTTS, Primary Examiner

C. L. MILLS, Assistant Examiner

U.S. Cl. X.R.
260—97.5, 690

PO-1050
(5/69)

UNITED STATES PATENT OFFICE
CERTIFICATE OF CORRECTION

Patent No. 3,595,887          Dated July 27, 1971

Inventor(s) Madhukar V. Kulkarni & Russell L. Scheribel

It is certified that error appears in the above-identified patent and that said Letters Patent are hereby corrected as shown below:

Col. 1, line 54, "adhesive" should read ---adhesives---.
Col. 3, line 32, "accordiigly" should read ---accordingly---.
       line 57, "of" should read ---in---.
       line 74, "Garner" should read ---Gardner---.
Col. 4, line 31, "gram" should read ---grams---.
Col. 9, line 5, "194.3" should read ---192.3---.
       line 38, "acidification" should read ---amidification---.
Col. 10, line 3, "85-1 00" should read ---85-110---.
       line 4, "50-71" should read ---50-70---.
       line 7, insert the title "II. PALLADIUM REHYDROGENATION".
       line 9, "prehydrogen" should read ---prehydrogen- ---.
       line 22, "(bercent" should read ---(percent---.
       line 24, "169" should read ---196---.
       line 41, "hydroenation" should read ---hydrogenation---.
       line 74, "0.11-1%" should read ---0.1-1%---.
Col. 11, line 1, "duced" should read ---ducted---.

Col. 9, line 5, cancel ", 193.9".

Signed and sealed this 15th day of February 1972.

(SEAL)
Attest:

EDWARD M. FLETCHER, JR.          ROBERT GOTTSCHALK
Attesting Officer                Commissioner of Patents